US012275627B2

(12) United States Patent
Mazzon et al.

(10) Patent No.: US 12,275,627 B2
(45) Date of Patent: Apr. 15, 2025

(54) FILLING VALVE GROUP FOR A FILLING MACHINE

(71) Applicant: GRUPPO BERTOLASO S.P.A., Zimella (IT)

(72) Inventors: Giovanni Mazzon, Lobia di San Bonifacio (IT); Lorenzo Rigoni, Cologna Veneta (IT); Gianluca Stella, Noventa Vicentina (IT); Enrico Galimberti, San Giorgio Bigarello (IT)

(73) Assignee: GRUPPO BERTOLASO S.P.A., Zimella (IT)

( * ) Notice: Subject to any disclaimer, the term of this patent is extended or adjusted under 35 U.S.C. 154(b) by 38 days.

(21) Appl. No.: 18/244,258

(22) Filed: Sep. 10, 2023

(65) Prior Publication Data

US 2024/0083734 A1 Mar. 14, 2024

(30) Foreign Application Priority Data

Sep. 12, 2022 (IT) ........................ 102022000018600

(51) Int. Cl.
*B67C 3/26* (2006.01)

(52) U.S. Cl.
CPC .............. *B67C 3/2614* (2013.01); *B67C 3/26* (2013.01); *B67C 2003/266* (2013.01); *B67C 2003/2668* (2013.01)

(58) Field of Classification Search
CPC ... B67C 3/2614; B67C 3/26; B67C 2003/266; B67C 2003/2668
See application file for complete search history.

(56) References Cited

U.S. PATENT DOCUMENTS 3,455,350 A * 7/1969 Aloys ........................ B67C 3/26 141/367
3,736,966 A * 6/1973 Dichiara ................... B67C 3/26 141/286

(Continued)

FOREIGN PATENT DOCUMENTS

DE 102018107912 A1 10/2018
EP 1772424 A2 4/2007

(Continued)

OTHER PUBLICATIONS

European Search Report for EP 23196707.6 Mailed On Jan. 19, 2024.
Italian Search Report for IT 202200018600 Mailed On May 4, 2023.

*Primary Examiner* — Nicolas A Arnett
(74) *Attorney, Agent, or Firm* — Rivka Friedman

(57) ABSTRACT

A filling valve group for a filling machine, comprising a supply duct for delivering a liquid into a container, an air return tube, and a shutter provided with a narrowing portion fixed to the supply duct and an enlarged portion fixed to the air return tube. In addition, the filling valve group comprises a centering body, which is placed at the outlet section of the supply duct to abuttingly receive the mouth of the container, and is removably fixed to a lower portion of the filling valve group by a first quick coupling. The filling valve group further comprises a fixed assembly, which forms an upper section of the supply duct, and a removable tube, which forms a lower section of the supply duct, carries fixed thereto the narrowing portion of the shutter and is removably fixed to the fixed assembly by a second quick coupling.

10 Claims, 5 Drawing Sheets

(56) References Cited

U.S. PATENT DOCUMENTS

| | | | | | |
|---|---|---|---|---|---|
| 4,342,344 | A * | 8/1982 | Ahlers | B67C 3/26 | 141/39 |
| 7,299,832 | B2 * | 11/2007 | Hartness | B67C 3/2637 | 141/144 |
| 7,661,449 | B2 * | 2/2010 | Stavrakis | B67C 3/2614 | 141/302 |
| 9,139,312 | B2 * | 9/2015 | Jenne | B67C 3/2614 | |
| 9,919,908 | B2 * | 3/2018 | Sweeny | B67C 3/002 | |
| 11,834,316 | B2 * | 12/2023 | Mowdy | B67C 3/2614 | |
| 2005/0045244 | A1 * | 3/2005 | Hartness | B67C 3/24 | 141/144 |
| 2005/0284537 | A1 * | 12/2005 | Hartness | B67C 7/002 | 141/144 |
| 2008/0271812 | A1 * | 11/2008 | Stefanello | B67C 3/004 | 141/242 |

FOREIGN PATENT DOCUMENTS

| | | | | |
|---|---|---|---|---|
| EP | 4105164 | A1 * | 12/2022 | B67C 3/2614 |
| FR | 2950608 | A1 | 4/2011 | |
| WO | WO-2013139413 | A1 * | 9/2013 | B67C 3/26 |

* cited by examiner

FILLING VALVE GROUP FOR A FILLING MACHINE

FIELD OF APPLICATION

The present invention regards a filling valve group for a filling machine for filling containers.

The present valve group is intended to be mounted on filling machines advantageously employed in the field of industrial bottling plants, and are intended to be employed for filling containers, such as for example bottles and cans, with liquids of alimentary type, such as for example non-alcoholic sparkling drinks, mineral water, fruit juices, wines etc.

In addition, the invention involves a filling machine provided with at least one said filling valve group.

STATE OF THE ART

As is known, the filling valve groups intended to be installed on filling machines for filling containers, such as for example cans and bottles, with liquids are generally fixed below a containment tank within which the liquid of alimentary type is preserved, such as for example sparkling non-alcoholic drinks, fruit juices, wine etc.

The valve groups of known type comprise a supply duct, which is placed in fluid communication with a containment tank of the filling machine for the flow of a liquid from the containment tank itself to a container to be filled with such liquid. The supply duct is extended with elongated shape between an inlet section, at which it is fixed to the containment tank and receives the liquid from the latter, and an opposite outlet section, at which a container to be filled is placed, which receives the liquid coming from the containment tank that transits along the supply duct.

In addition, the valve groups generally comprise a centering body, which is placed at the outlet section of the supply duct, and comprises a seal against which, during the filling step, the mouth of the container to be filled is placed in abutment.

The aforesaid centering body is placed coaxial with the supply duct, and has the function of centering the container with respect to the supply duct. In addition, if the filling machine is of isobaric type, hence usable for filling the containers with a liquid under pressure (such as for example a sparkling liquid), the centering bell, and in particular its seal, has the further function of ensuring the seal of the pressure within the container during the filling step, which in a known manner is maintained equal to the pressure of the containment tank, which is greater than the ambient pressure.

In addition, the valve groups of known type comprise an air return tube, which is placed to traverse the supply duct and has the function of suctioning the air coming from the container during the step of filling the latter, which is gradually substituted by the liquid itself within the container.

The valve groups comprise, in addition, a shutter which is placed to intercept the supply duct in order to allow or prevent the passage of the liquid through the supply duct. The shutters of known type are provided with a narrowing portion, generally fixed to the supply duct, and with an enlarged portion, generally fixed to the air return tube, which is movable with respect to the narrowing portion and is susceptible of interfering with this in order to prevent or allow the passage of the liquid through the supply duct.

In recent years, the need has arisen to be able to fill containers of different shapes with one same filling machine, so as to increase the efficiency and flexibility of production of the bottling plants. In particular, in order to fill containers of different shape, the valve groups equipping the filling machine must be adaptable to different container shapes.

More in detail, the containers can vary, for example with regard to the diameter of the neck of the bottle, and hence the supply duct must be sufficiently flexible from the operating standpoint in order to fill containers with diameter of the neck and of the opening that even differ greatly from each other.

For such purpose, valve groups were introduced on the market that are provided with a centering body removably fixed to a lower portion of the valve group itself, by means of a quick coupling, e.g. of bayonet type. In this manner, if the filling machine provided with such valve groups must be employed for filling containers of different size, an operator proceeds with the substitution of the centering body suitable for a first container shape with a different centering body suitable for a second container shape for each valve group of the filling machine. Since this is a quick coupling, such operation requires brief times, allowing the single valve group, and consequently the entire filling machine, to be reconfigured for filling containers, reducing machine stop times to the minimum, and hence also reducing the production costs.

Several examples of valve groups of the type briefly mentioned above are described in the documents EP 1772424 A2 and FR 2950608 A1.

Such filling valve groups of known type have in practice shown that they do not lack drawbacks.

The main drawback lies in the fact that the substitution of the centering body, even if necessary in order to allow centering the container with respect to the supply duct and to ensure the sealing of the pressure within containers of different size, does not modify the flow of the liquid from the supply duct to the containers themselves.

In particular, since the flow of liquid is independent of the centering body mounted on the valve group, it is evident that is also independent of the shape of the container to be filled.

However, such characteristic of the valve groups of known type is a drawback, since it does not allow filling different containers with a same level of efficiency. Indeed, if the valve group is suitable for filling containers with narrower opening, e.g. bottles, with a corresponding requested flow of liquid, if such valve group is configured for filling containers with wider opening, e.g. cans, the flow of liquid that was previously set will not be optimal, for example there will be an increase of the foam in the case of sparkling drinks.

PRESENTATION OF THE INVENTION

In this situation, the problem underlying the present invention is to overcome the drawbacks shown by the prior art known up to now, by providing a filling valve group for a filling machine, which is adaptable for filling containers with different shapes and which allows adjusting the flow of liquid as a function of the shape of the container to be filled.

Further object of the present invention is to provide a filling valve group for a filling machine, which provides for reduced machine stop times for the reconfiguration for filling containers of different size.

Further object of the present invention is to provide a filling valve group for a filling machine, which ensures a high operating flexibility.

Further object of the present invention is to provide a filling valve group for a filling machine that is structurally simple and entirely reliable in operation.

BRIEF DESCRIPTION OF THE DRAWINGS

The technical characteristics of the invention, according to the aforesaid objects, and the advantages of the same, will be more evident from the following detailed description, made with reference to the enclosed drawings, which represent a merely exemplifying and non-limiting embodiment of the invention, in which.

DETAILED DESCRIPTION OF A PREFERRED EMBODIMENT

Figure 1:
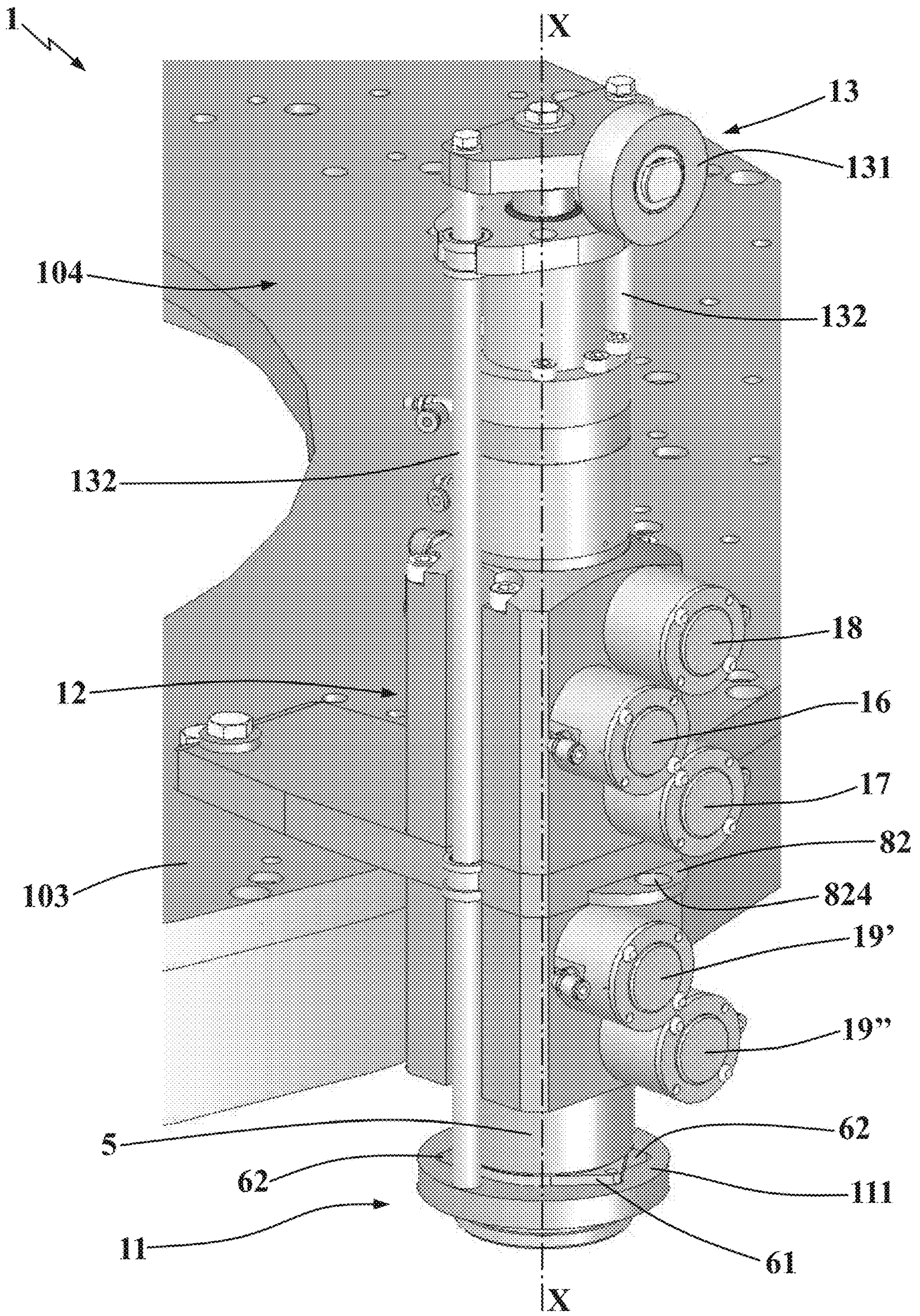
FIG. 1 shows a perspective view of the filling valve group for a filling machine, object of the present invention, fixed to a rotary carousel of a filling machine.

With reference to the enclosed drawings, reference number 1 overall indicates an embodiment of a filling valve group, object of the present invention.

The present valve group 1 is intended to be mounted on filling machines advantageously employed in the field of industrial bottling plants, which are intended to be employed for filling containers 102, such as bottles and cans, with liquids of alimentary type such as non-alcoholic sparkling drinks, mineral water, fruit juices, wines etc.

The filling machines for alimentary liquid products are advantageously conventionally provided with a fixed support frame, on which a support structure 104 is mounted, which supports a containment tank 105, preferably cylindrical, in which a liquid to be bottled is contained.

In addition, on the support structure 104, a plurality of the aforesaid valve groups 1 are peripherally fixed, each of which in fluid communication with the containment tank 105 in order to convey the liquid from the containment tank 105 itself to the interior of the containers 102 to be filled, which are in general placed below the aforesaid valve groups 1.

Advantageously, the support structure 104 is constituted by a rotary carousel 103, which is rotatably mounted on the aforesaid support frame, and in such case the machine is of rotary type. In an entirely analogous manner, the support structure 104 of the filling machine can be a fixed structure, and in such case the filling machine is of linear type.

The filling valve group 1, object of the present invention, comprises a supply duct 2 susceptible of being placed in fluid communication with the aforesaid containment tank 105 for the flow of a liquid from the containment tank 105 itself to a container 102 to be filled with the liquid.

Preferably, the valve group 1, object of the present invention, is intended to be fixed to the support structure 104 of the filling machine and to be placed in fluid communication with the containment tank 105.

According to an embodiment not represented in the enclosed figures, the valve group 1, object of the present invention, is intended to be fixed below the aforesaid containment tank 105, in fluid communication with the latter.

Advantageously, the containers 102, which the valve group 1, object of the present invention, is adapted to fill, are cans, which as is known can be of various size, and in particular they can have different height and diameter.

Advantageously, the filling machine on which the valve group 1, object of the present invention, is adapted to be installed is an isobaric rotary machine, hence in particular it is suitable for filling containers 102 with liquids of alimentary type under pressure, such as beers, sparkling drinks etc.

More in detail, the supply duct 2 is extended along a main extension axis X between an inlet section 21, and an opposite outlet section 22, at which it is susceptible of being associated with the container 102 to be filled.

Advantageously, the supply duct 2 comprises an inlet opening 211, which is placed at the inlet section 21 and through which the supply duct 2 is fed with the liquid coming from the containment tank 105. In addition, the supply duct 2 comprises an outlet opening 221, which is placed at the outlet section 22 and which is traversed by the liquid in order to feed the container 102, which is preferably placed below the outlet opening 22.

Preferably, the valve group 1 comprises a feed duct 14, which is placed in fluid communication at least with the supply duct 2, in particular at the aforesaid inlet opening 211, and the containment tank 105, so as to transfer the liquid from the containment tank 105 to the supply duct 2 itself.

Advantageously, the feed duct 14 is fixed to the supply duct 2, laterally to the latter, in a manner such that the flow of the liquid from the feed duct 14 to the supply duct 2 is tilted with respect to the main extension direction X.

The valve group 1 comprises, in addition, an air return tube 3, which is extended along the main extension axis X, advantageously between an upper end 31 and an opposite lower end 32, and is placed at least partially within the supply duct 2, in particular coaxial with the latter.

Advantageously, the return tube 3 defines a passage channel 33 through which, for example during a step of filling the container 102, the air contained within the latter is intended to be evacuated. In this manner, the air initially present within the container 102 is progressively substituted by the liquid and its evacuation by means of the return tube 3 prevents the formation of a counter-pressure that opposes the descent of the liquid itself.

In addition, the valve group 1, object of the present invention, comprises a shutter 4, which is placed to intercept the supply duct 2 in order to selectively allow the passage of the liquid through the supply duct 2 itself. The aforesaid shutter 4 is provided with a narrowing portion 41 fixed to the supply duct 2 and an enlarged portion 42 fixed to the air return tube 3 and movable with respect to the aforesaid narrowing portion 41 in order to open and close the shutter 4 itself.

Advantageously, the enlarged portion 42 of the shutter 4 can be made in a single body with the air return tube 3. Of course, without departing from the protective scope of the present invention, the enlarged portion 42 of the shutter 4 can be made separately with respect to the air return tube 3.

Advantageously, the valve group 1 also comprises a first actuator 15, which is mechanically connected to the upper end 31 of the air return tube 3 in order to move it along the main extension axis X between a closed position, in which the enlarged portion 42 acts in abutment against the narrowing portion 41 of the shutter 4 in order to prevent the passage of the liquid through the supply channel 2 (in such situation the shutter 4 is closed), and an open position, in which the enlarged portion 42 is placed spaced from the narrowing portion 41 in order to allow the passage of the liquid through the supply channel 2 (in such situation the shutter 4 is open).

More in detail, since the enlarged portion 42 of the shutter 4 is fixed to the return tube 3, the movement of the latter by means of the first actuator 15 involves the opening and the closing of the shutter 4 itself.

Preferably, the first actuator 15 for example comprises an electropneumatic actuator, which since it is known in the field will not be described in more detail hereinbelow.

Advantageously, the shutter 4 comprises a seal which is at the point in which, in the closed position, the enlarged portion 42 abuts against the narrowing portion 41, and for example is fixed to the enlarged portion 42.

In accordance with the embodiment illustrated in the enclosed figures, the enlarged portion 42 of the shutter 4 (fixed to the air return tube 3) is placed above the narrowing portion 41 (fixed to the supply duct 2). In particular, in such embodiment, in the open position the air return tube 3 is lifted, in a manner such to place the enlarged portion 42 spaced from the narrowing portion 41, and in the closed position the air return tube 3 is lowered, in a manner such to bring the enlarged portion 42 to abut against the narrowing portion 41.

In accordance with a different embodiment, the enlarged portion 42 is placed below the narrowing portion 41 and, in particular, in the open position, the air return tube 3 is lowered, so as to place the enlarged portion 42 spaced from the narrowing portion 41, and in the closed position the air return tube 3 is lifted, such to bring the enlarged portion 42 in abutment against the narrowing portion 41.

The valve group 1 comprises, in addition, a centering body 5, mounted on a lower portion 11 of the valve group 1, placed at the outlet section 22 of the supply duct 2 and comprising a seal 51 placed on a first lower surface 52 thereof susceptible of receiving in abutment the mouth of the container 102 to be filled, so as to center it with respect to the supply duct 2 and to ensure the seal of the pressure within the container 102 during a step of filling the container 102 itself.

With the expression "centering body" 5 it must be intended the body against which the mouth of the container 102 is intended to be sealingly abutted, regardless of an effective centering action of the container 102 with respect to the centering body 5 itself following the interaction between the two. In other words, advantageously but not exclusively, the centering body 5 will have a bell shape susceptible of centering the container 102 with respect to the supply duct 2 and nevertheless it could simply abut against the container 102.

More in detail, the aforesaid centering body 5 is removably fixed to the lower portion 11 of the valve group 1 by means of a first quick coupling 6.

Advantageously, the lower portion 11 of the valve group 1 comprises an annular support element 111, which is in particular movable along the main extension axis X and is mechanically connected to a second actuator 13. More in detail, the centering body 5 is fixed by means of the first quick coupling 6 to the aforesaid annular support element 111.

Preferably, the aforesaid second actuator 13 comprises, in a per se known manner, a cam (not represented in the enclosed figures) susceptible of being fixed to the support frame of the filling machine, and a cam follower 131, which is intended to be engaged with the cam.

In addition, the first actuator 13 comprises at least one vertical rod 132, preferably two placed parallel to each other, mechanically connected to the cam 131 and to the annular support element 111 in order to move it along the main extension axis X between a first position, in which the centering body 5 is placed spaced from the mouth of the container 102, and a second position in which the centering body 5, and in particular its seal 51, is placed in abutment against the mouth of the container 102 to be filled.

According to a different embodiment not represented in the enclosed figures, the lower portion 11 is a fixed portion and hence the centering body 5 is fixed with respect to the supply duct 2. In this situation, the filling machine on which the valve group 1 is intended to be installed comprises at least one movable plate, positioned below the valve group 1, such movable plate susceptible of vertically translating in order to move the mouth of the container 102 closer to or further from the centering body 5, and in particular to/from the seal 51.

Figure 5:
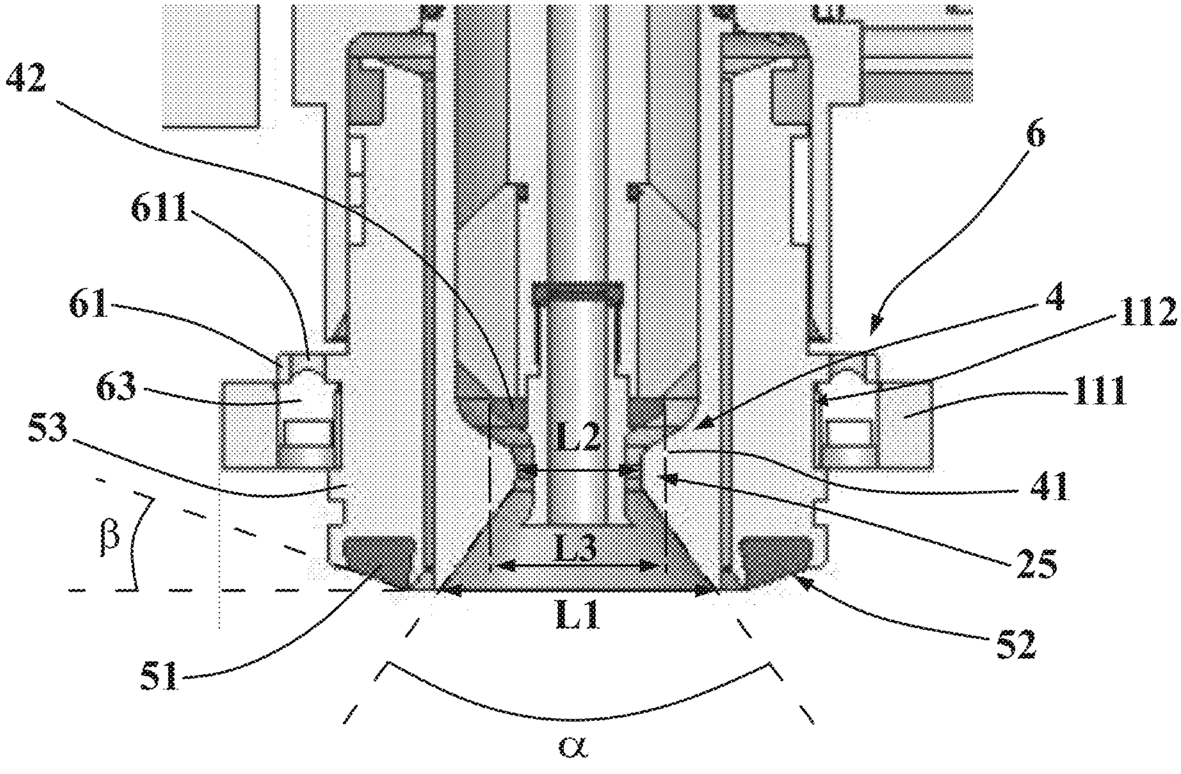
FIG. 5 shows a sectional view of a detail of the valve group of FIG. 1.

As seen in FIG. 5, the first lower surface 52 is extended with substantially frustoconical shape around the main extension axis X and is tilted with respect to the latter by a second angle β. In particular, the second angle β varies with the variation of the shape of the container 102 to be filled in order to be adapted to the latter and center it with respect to the supply duct 2.

Figure 4A:
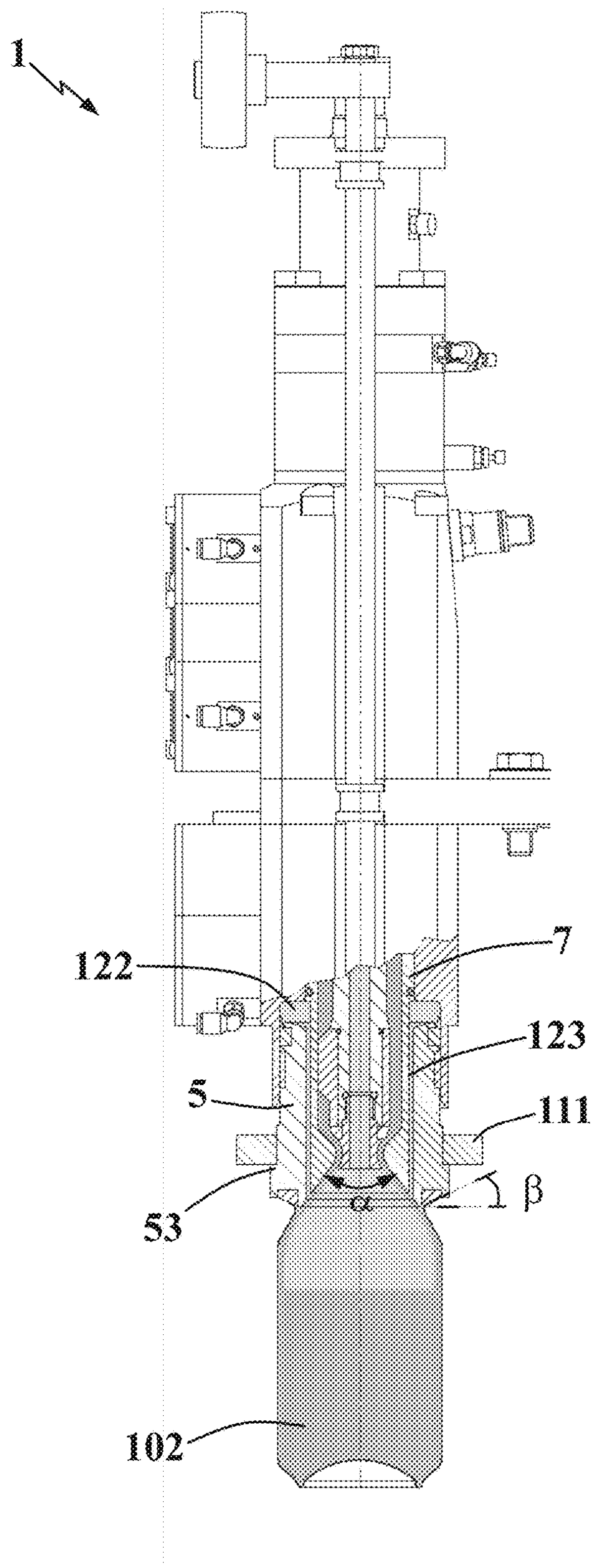
FIGS. 4*a* and 4*b* show a side view, with several components in section in order to better illustrate the characteristics thereof, of the valve group, object of the present invention, with two containers with geometric characteristics that differ from each other, which are placed in abutment against a respective centering body.
Figure 4B:
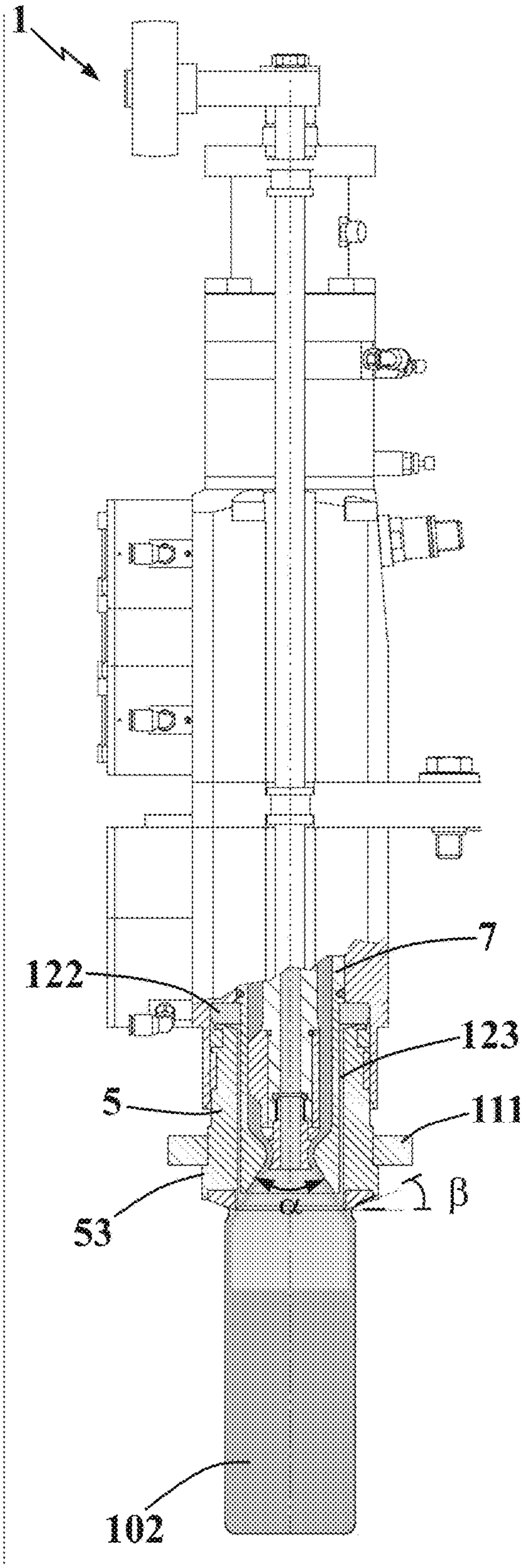

For this reason, as seen in FIGS. 4*a* and 4*b*, multiple centering bodies 5 can be provided, each provided with a seal 51 and a first lower surface 52 tilted by a aforesaid corresponding second angle β specially designed for centering a specific container 102 with respect to the supply duct 2 and to ensure the seal of the pressure at its interior.

According to the idea underlying the present invention, the valve group 1 comprises a fixed assembly 12 mechanically and rigidly connectable to the support structure of the filling machine 110, which forms an upper section 23 of the supply duct 2.

Advantageously, in an entirely known manner, such fixed assembly 12 comprises a plurality of members such as for example valves 16-19 for the connection with operating fluids. More in detail, the fixed assembly 12 preferably comprises at least one return valve 16, a pressurization valve 17, a washing valve 18 and an exhaust valve 19.

Preferably, the aforesaid return valve 16 selectively places in fluid communication the interior of the container 102 to be filled with the outside environment (or with a suitable gas recovery tank with which the filling machine is equipped) through the passage channel 33 of the return tube 3 in order to allow the evacuation of the air from the container 102 during a filling step.

Advantageously, the pressurization valve 17 selectively places in fluid communication the container 102 with the containment tank 105 or with a first auxiliary tank (not represented in the enclosed figures) containing inert gas, in particular through the passage channel 33 of the return tube 3, in order to bring the pressure within the container 102 to a value equal to the pressure within the containment tank 105 before the filling step.

Preferably, the first auxiliary tank contains inert gas at a first pressure substantially equal to the pressure within the containment tank 105.

Advantageously, the washing valve 18 selectively places in fluid communication the container 102 with the containment tank 105 or with a second auxiliary tank (not represented in the enclosed figures) containing inert gas, in particular by means of the passage channel 33 of the return tube 3, in order to remove the air, oxygen-rich, within the container 102 before the filling step and substituting it with inert gas.

Preferably, the second auxiliary tank contains inert gas at second pressure substantially lower than or equal to the pressure within the containment tank 105 and greater than the ambient pressure.

Advantageously, the valve group 1 comprises a compensation chamber 122, which is in fluid connection with the interior of the container 102 and with the outside environment in order to allow the passage of air from the container 102 itself towards the outside environment.

Preferably, the valve group comprises a first exhaust valve 19', which selectively places in fluid communication the container 102 with the outside environment, in particular by means of the compensation chamber 122, in order to allow the evacuation of the gas moving within the container 102 during the step of washing the latter. In particular, the first exhaust valve 19' is open when the washing valve 18 is open, such that, during the washing step, the inert gas coming from the containment tank 105 or from the second auxiliary tank, passing through the return tube 3, reaches the container 102, pushing outside of the latter the oxygen-rich air, through the compensation chamber 122.

Preferably, the valve group comprises a second exhaust valve 19", which selectively places in fluid communication the container 102 with the outside environment, in particular by means of the compensation chamber 122, in order to bring the pressure within the container 102 back to a value equal to that of the atmospheric pressure at the end of the filling step.

In addition, according to the idea underlying the present invention, the valve group 1 comprises a removable tube 7, which forms a lower section 24 of the supply duct 2 and is removably fixed to the aforesaid fixed assembly 12 by means of a second quick coupling 8. More in detail, the removable tube 7 carries fixed thereto the narrowing portion 41 of the shutter 4.

Advantageously, the narrowing portion 41 of the shutter 4 is made in a single body with the removable tube 7. Of course, without departing from the protective scope of the present invention, the narrowing portion 41 of the shutter 4 can be made separately with respect to the removable tube 7.

As stated above, the shutter 4 intercepts the aforesaid supply duct 2, and hence the liquid, which traverses the latter in order to pass from the containment tank 105 to the container 102 below the valve group 1, interacts with the shutter 4. More in detail, when the shutter 4 is open, the geometric shape of the latter, and in particular of its narrowing portion 41, and optionally of its enlarged portion 42, and the relative position between these two, determine the flow of the liquid from the supply duct 2 to the container 102 to be filled.

By flow of the liquid, it must be intended in this case the fluid-dynamic behavior of the liquid itself, and in particular its speed and its direction, in particular with respect to the internal wall of the container 102, during its passage from the supply duct 2 to the container 102 itself.

More in detail, the interaction between the liquid and the container 102 (in particular with its mouth and its internal wall) during the filling step affects the efficiency and the quality of the bottling. In particular, in order to optimize the filling of a container 102 with a particular shape, the geometric characteristics of the shutter 4 are generally specially designed so as to optimize the flow of the liquid for the particular shape of the container 102 itself.

In the valve groups 1 suitable for filling containers 102 with shapes different from each other of known type, so as to pass from the filling of a first type of container 102 to the filling of a second type of container 102 with shape different from the first, only the centering body 5 is substituted, such to ensure the centering of the specific container 102 with respect to the supply duct 2, and, in the case of isobaric filling machine, to ensure the seal of the pressure within the container 102 itself. In particular, multiple centering bodies 5 are generally provided, each of which provided with a seal 51 that is sized with respect to the type of container 102 to be filled.

Nevertheless, in such situation, since the shutter 4 is independent of the centering body 5, this remains substantially equal to itself following the substitution of the centering body 5. For this reason, in the valve groups 1 of known type, the flow of the liquid from the supply duct 2 to the container 102 is not adaptable to the specific type of container 102 to be filled.

With the valve group 1, object of the present invention, instead, since the narrowing portion 41 of the shutter is fixed to the removable tube 7 and the latter can be substituted, it is evident that the narrowing portion 41 itself, and consequently the shutter 4, can be modified in order to be adapted to the filling of different types of containers 102. As is clear for example in FIGS. 4*a* and 4*b*, multiple removable tubes 7 can be provided, each of which provided with a narrowing portion 41 shaped for optimizing the filling of a corresponding container 102.

Advantageously, the narrowing portion 41 of the shutter 4, which is fixed to the removable tube 7, comprises a flared wall 411 that is extended from a narrow internal section 25 of the supply duct 2 to the enlarged outlet section 22 (enlarged with respect to the narrow internal section 25) of the same supply duct 2 for the evacuation of the liquid towards the container 102 to be filled.

Preferably, the outlet section 22 of the supply duct 7 is provided with a first width L1, and the narrow internal section 25 is provided with a second width L2 smaller than or equal to the first width L1. In particular, the first width L1 is greater than the second width L2, such that the supply duct 2 widens going from the narrow internal section 25 to the enlarged outlet section 22.

Advantageously, the second width L2 corresponds with the width of the supply duct at the narrowing portion 41 of the shutter 4, and it is the minimum width of the supply duct 2 itself.

By width in this case it must be intended the maximum width of the specific section measured transverse to the main extension axis X. In the event in which the supply duct 2 is extended with axial-symmetric shape along the main extension axis X, the width coincides with the diameter of the specific section.

Advantageously, the enlarged portion 42 of the shutter 4 is provided with a third width L3, which is greater than the second width L2 of the narrow internal section 25. In this manner, the enlarged portion 42 of the shutter is susceptible of abutting against the narrowing portion 41, preventing the passage of the liquid.

The narrowing portion 41 of the shutter 4 also comprises a tapered wall 412 which is extended around the main extension axis X starting from the narrow internal section 25 in opposite direction with respect to the flared wall 411 away from the main extension axis X itself. In particular, along such tapered wall 412, the supply duct 2 narrows going towards the narrow internal section 25.

In accordance with the embodiment illustrated in the enclosed figures, in which the enlarged portion 42 (fixed to the air return tube aria 3) of the shutter 4 is placed above the narrowing portion 41, the tapered wall 412 is susceptible of interfering with the enlarged portion 42 of the shutter 4 in order to close the shutter 4 itself when the air return tube 3 is in closed position.

In accordance with the aforesaid different embodiment in which the enlarged portion 42 of the shutter 4 is placed below the narrowing portion 41, the flared wall 411 is susceptible of interfering with the enlarged portion 42 of the shutter 4 in order to close the shutter 4 itself when the air return tube 3 is in closed position.

Advantageously the two flared 411 and tapered 412 walls of the narrowing portion 41 of the shutter 4 define an annular nosepiece 73 whose shape is advantageously designed in order to be employed in association with a type of container 102 to be filled.

In particular, in operation, the flared wall 411 directs the flow towards the container 102 and has angle specially designed that depends on the shape of the container 102 itself.

Preferably the removable tube 7 is extended with shape elongated along the main extension axis X between a first end 71, at which the outlet opening 221 of the supply duct 2 is placed, and an opposite second end 72.

As seen in FIG. 5, the flared wall 411 is extended with substantially frustoconical shape around the main extension axis X away from the latter towards the outlet section 22. Advantageously, the flared wall 411 is tilted with respect to the main extension axis X by a first angle α.

Advantageously, the first angle α of the flared wall 411 determines the direction of the flow of the liquid from the supply duct 2 to the container 102. In particular, the first angle α varies with the variation of the shape of the container 102 in order to be adapted to the latter.

For this reason, as is evident in FIGS. 4*a* and 4*b*, multiple removable tubes 7 can be provided, each provided with an aforesaid annular nosepiece 73 and an aforesaid flared wall 411 tilted by a corresponding aforesaid first angle α specially designed for optimizing the filling of a corresponding container 102.

Advantageously, in accordance with the embodiment illustrated in the enclosed figures, the lower end 32 of the air return tube 3 is positioned within the supply duct 2 below the narrow internal section 25 of the latter, preferably between the narrow internal section 25 and the outlet section 22, in particular when the air return tube 3 is in closed position and, preferably, also when this is in open position.

According to the embodiment represented in the enclosed figures, the fixed assembly 12 comprises an internal channel 121, which is extended along the main extension axis X. Preferably, the internal channel 121 is defined, in a first portion 121' thereof, by the upper section 23 of the supply duct 2, and is engaged, in a second portion 121" thereof, internally and coaxially by the removable tube 7. Advantageously, the second end 72 of the removable tube 7 is placed within the internal channel 121, and the first end 71 projects with respect to the internal channel 121.

According to the embodiment represented in the enclosed figures, the centering body is placed at the first end 71 of the removable tube 7, in particular outside and coaxial with the latter.

Preferably, the centering body 5 is placed, at least partially, within and coaxial with the internal channel 121 of the fixed assembly 12.

Advantageously, the removable tube 7 and the centering body 5 are placed radially spaced from each other with a clearance that defines an annular channel 123, which is susceptible of placing the interior of the container 102 in fluid communication with the compensation chamber 122.

Advantageously, the second quick coupling 8 comprises a first groove 81, which is obtained externally on the removable tube 7, and a blocking element 82 integral with the fixed assembly 12 and mechanically removably engaged in the first groove 81 in order to retain the removable tube 7 mechanically connected to the fixed assembly 12 itself.

Preferably, the first groove 81 is made on the external surface of the removable tube 7 and is extended as a ring around the main extension axis X.

Advantageously, the fixed assembly 12 comprises at least one retention seat 85, within which the blocking element 82 is susceptible of being placed, at least partially.

Advantageously, the blocking element 82 is engaged in the retention seat 85, which is placed in connection with the first groove 81 of the removable tube 7, and is movable, preferably along a direction substantially perpendicular to the main extension axis X, between a blocking configuration and a release configuration.

Preferably, in the blocking configuration, the blocking element 82 engages the retention seat 85 and the first groove 81 in order to prevent the movement of the removable tube 7 along the main extension axis X, and in the release configuration the blocking element 82 is disengaged at least from the first groove 81 in order to allow the removal of the removable tube 7 along the main extension axis X.

According to the embodiment represented in the enclosed figures, the blocking element 82 comprises a central body from which two retention arms are extended, in particular parallel to each other, each of which intended to be placed within the retention seat 85 and at least partially within the first groove 81 in order to prevent the sliding of the removable tube 7 along the main extension axis X.

Preferably, the retention seat 85 is placed in connection with the internal channel 121 of the fixed assembly 12. In this manner, with the blocking element 82 placed within the retention seat 85 in the blocking position, each retention arm thereof projects within the internal channel 121.

Advantageously, the removable tube 7 is placed within the internal channel 121 with the first groove 81 placed in connection with the retention seat 85. In this manner, with the blocking element 82 in the blocking position, each retention arm thereof engages both the retention seat 85 and the first groove 81, preventing the sliding of the removable tube 7 along the main extension axis X.

Advantageously, the central body of the blocking element 82 comprises a through hole 824 which is susceptible of being used by an operator, e.g. by inserting a hook or a finger therein, in order to move the blocking element 82 between the blocking position and the release position.

Preferably, the second quick coupling 8 comprises at least one first presser 84, advantageously ball presser, mounted integral with the fixed assembly 12, which interferes in retention relationship with a corresponding first engagement seat 821 of the blocking element 82 in order to prevent the movement thereof from the blocking configuration to the release configuration.

Advantageously, the first engagement seat 821 is made on the central body of the blocking element 82.

Preferably, with the blocking element 82 in the blocking configuration, the first presser 84 engages the first engagement seat 821 in shape relationship, with the blocking element 82 in the release position the first presser 84 is disengaged from the first engagement seat 821.

Advantageously, the first quick coupling 6 comprises at least one retention tab 61 fixed to the centering body 5 and extended radially with respect to the main extension axis X. Preferably, the retention tab 61 is made in a single body with the centering body 5. Preferably, the annular support element 111 is extended along a main extension axis X starting from an abutment element 113, advantageously towards a second lower surface 114, and on which an insertion seat 112 is made.

Advantageously, the abutment element 113 is extended on a first lying plane substantially perpendicular to the main extension axis X.

Advantageously, the centering body 5 is placed at least partially within the insertion seat 112 and the retention tab 61 is in abutment against the abutment element 113 in order to prevent the movement of the centering body 5 itself along the main extension axis X.

In this manner, when the movable support element 111 is moved by the second actuator 13 from the second position to the first position (hence from bottom to top), the annular support element 111, and in particular its abutment wall 113, abuts against the retention tab 61 so as to move the centering body 5 integral with itself from bottom to top.

According to the embodiment represented in the enclosed figures, the first quick coupling 6 comprises two retention tabs 61, advantageously fixed to the centering body in diametrically opposite positions with respect to each other, with respect to the main extension axis X. Advantageously, the retention tabs 61 are made in a single body with the centering body 5.

Preferably, the first quick coupling 6 comprises at least one slide seat 62, made on the annular support element 111, which is extended along the main extension axis X, is connected to the insertion seat 112 and is provided with a transverse section with respect to the main extension axis X that is counter-shaped with respect to the retention tab 61.

According to the embodiment represented in the enclosed figures, the first quick coupling 6 comprises two slide seats 62, made on the annular support element 111, placed in connection with the insertion seat 112 and in diametrically opposite positions with respect to each other, with respect to the main extension axis X.

More in detail, the centering body 5 is rotatable around the main extension axis X between an engagement position, in which each retention tab 61 is misaligned with respect to a corresponding slide seat 62 in order to prevent the movement of the centering body 5 along the main extension axis X, and a disengagement position, in which each retention tab 61 is aligned with respect to a corresponding slide seat 62 in order to allow the movement of the centering body 5 along the main extension axis X so as to extract it from the insertion seat 112 itself.

Advantageously, the centering body 5 comprises at least one abutment tab 53, which is intended to abut against the second lower surface 114 of the annular support element 111.

Preferably, each abutment tab 53 is placed vertically aligned with a corresponding retention tab 61 spaced from the latter along the main extension axis X. Without departing from the protective scope of the present invention, the centering body 5 comprises an abutment tab 53, which is annularly extended around the main extension axis X.

In this manner, when the movable support element 111 is moved by the second actuator 13 from the first position to the second position (hence from top to bottom), the annular support element 111, and in particular its second lower surface 114, acts in abutment against each abutment tab 53 so as to move the centering body 5 integral with itself from top to bottom.

Advantageously, the centering body 5 comprises at least one second engagement seat 611, in particular made on a corresponding retention tab 61.

Preferably, the first quick coupling 6 comprises at least one second presser 63, advantageously ball presser, mounted integral with the annular support element 111, which interferes in retention relationship with a corresponding second engagement seat 611 of the retention tab 61 in order to prevent the rotation of the centering body 5 around the main extension axis X from the engagement position to the disengagement position.

Preferably, with the centering body 5 in the engagement configuration, the second presser 63 engages in shape relationship with a corresponding second engagement seat 611, with the centering body 5 in the disengagement position the second presser 63 is disengaged from the corresponding second engagement seat 611.

According to the embodiment represented in the enclosed figures, the first quick coupling 6 comprises two first pressers 63 mounted integral with the annular support element 111 in a position diametrically opposite each other with respect to the main extension axis X, each of which susceptible of interfering with a corresponding aforesaid second engagement seat 611 made on a corresponding aforesaid retention tab 61.

Also forming the object of the present invention is a filling machine for filling containers 102 with liquids, comprising at least one valve group 1 of the above-described type, regarding which the same numeric references will be maintained for the sake of description clarity.

Advantageously, the filling machine is conventionally inserted within a bottling plant downstream of a rinsing machine and upstream of a capping machine.

Preferably, the filling machine is an isobaric machine, hence in particular it is suitable for filling containers 102 with liquids of alimentary type under pressure, such as beer, sparkling drinks etc.

Advantageously, the filling machine, object of the present invention, is an isobaric filling machine for filling cans with liquids of alimentary type.

Figure 2:
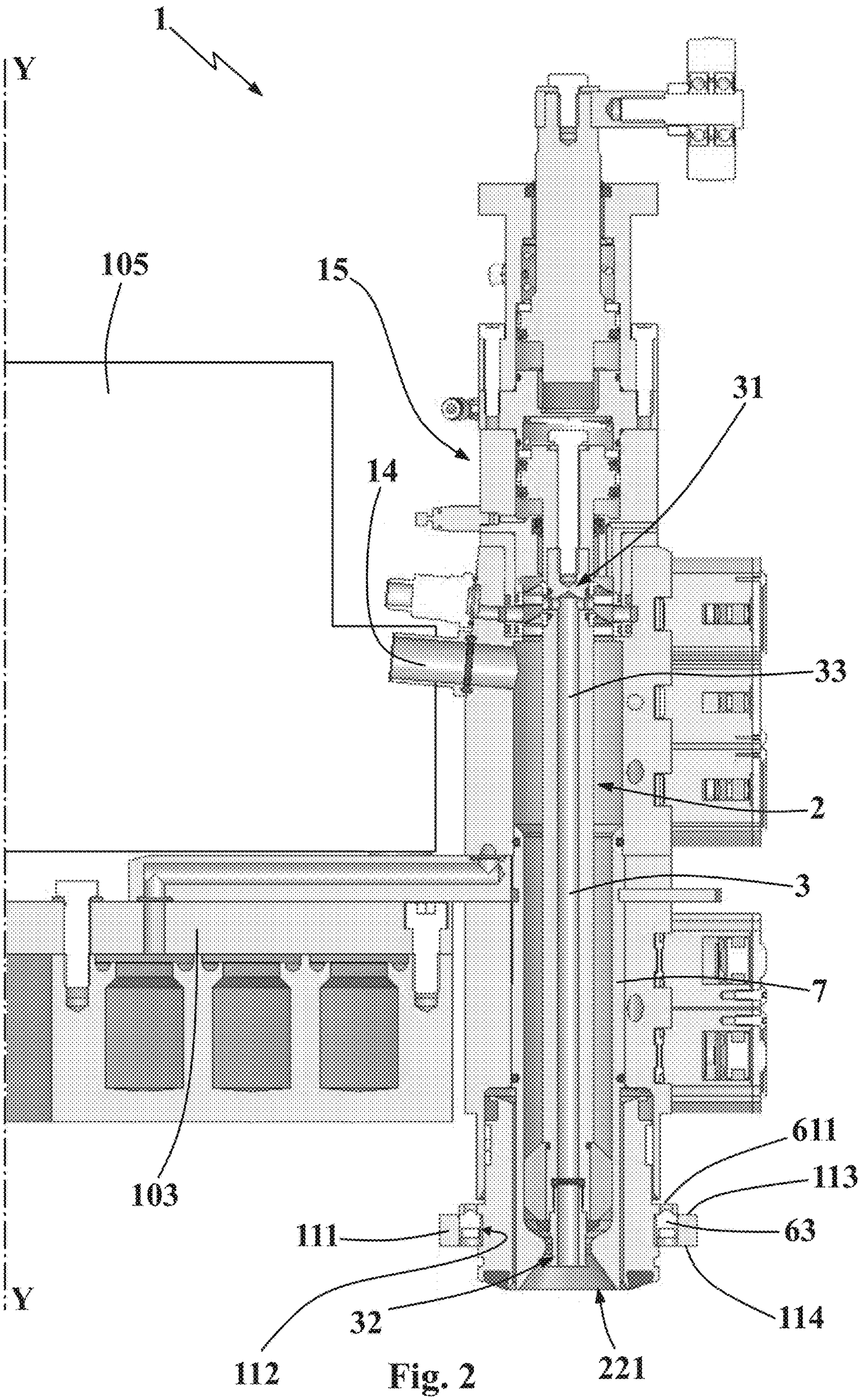
FIG. 2 shows a sectional view on a cutting plane parallel to a main extension axis of the valve group of FIG. 1.
Figure 3:
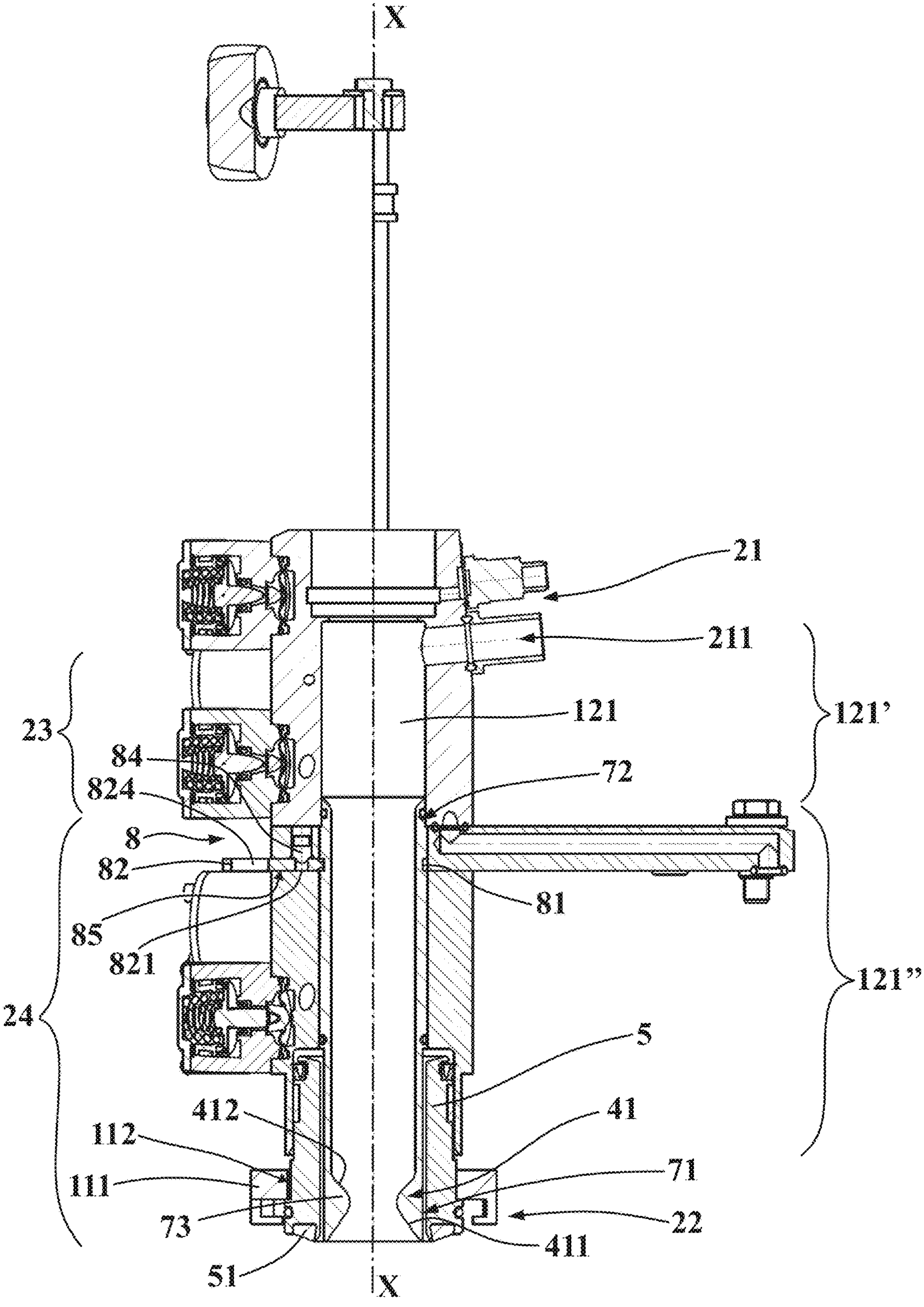
FIG. 3 shows a sectional view on a cutting plane parallel to a main extension axis of a supply duct of the valve group of FIG. 1.

The filling machine, object of the present invention, comprises a rotary carousel 103, provided with at least one containment tank 105 of a liquid to be bottled, and such containment tank 105 is schematically represented in FIG. 2.

Advantageously, the filling machine also comprises a support frame, which is intended to be abutted against the ground and rotatably carries, mounted thereon, the aforesaid rotary carousel 103. More in detail, the rotary carousel 103 is adapted to rotate around a substantially vertical rotation axis Y. Preferably, the rotary carousel 103 is adapted to rotate around a central rotation shaft thereof, advantageously parallel to the rotation axis Y, and such central rotation shaft is mounted on the support frame.

The containment tank 105 preferably has annular shape and is fixed coaxial with the rotary carousel 103 in order to rotate together with the latter during the operation of the filling machine.

More in detail, the aforesaid valve group 1 is fixed to the rotary carousel 103 and is placed in fluid communication with the containment tank 105, in order to allow the passage of the liquid from the containment tank 105 to the container 102 to be filled through the aforesaid supply duct 2.

Preferably, the valve group 1 is fixed to the rotary carousel 103 with the main extension axis X substantially parallel to the central rotation shaft of the filling machine.

Advantageously, the rotary carousel 103 carries, peripherally mounted thereon, a plurality of valve groups 1, which, in particular, are placed equidistant from each other around the central rotation shaft of the rotary carousel 103 itself.

The valve group 1 of the filling machine can be suitably provided with one or more, preferably with all the characteristics described above and therefore will not be described in detail hereinbelow.

Also described below is a method for the substitution of a removable tube 7 of a valve group 1 of the above-described type, regarding which the same reference numbers will be maintained for the sake of description clarity.

Advantageously, the aforesaid method is applied in the event it is necessary, for various operating needs, to substitute the removable tube 7 of the valve group 1. For example, if it is necessary to reconfigure the valve group 1 for filling a different container 102 type, the removable tube 7 is substituted with an analogous removable tube 7 with geometric characteristics that are different from that just removed, such to adapt the flow of the liquid to the different geometric shape of the new type of container 102 to be filled.

The method comprises a release step, in which the second quick coupling 8 is actuated for releasing the sliding of said removable tube 7 along said main extension axis X.

More in detail, in such step the blocking element 82 is moved from the blocking configuration, in which the blocking element 82 engages the retention seat 85 and the first groove 81 in order to prevent the movement of the removable tube 7 along the main extension axis X, to the release configuration, in which the blocking element 82 is disengaged at least from the first groove 81 in order to allow the movement of the removable tube 7 along the main extension axis X.

Subsequently, the method comprises a removal step, in which the removable tube 7 is completely disengaged from said fixed assembly 12, in particular by moving it along the main extension axis X up to completely disengaging it from the second portion 121" of the internal channel 121 of the fixed assembly.

The method, in addition, comprises an insertion step, in which a different removable tube 7 is engaged with the fixed assembly 12. More in detail, in such step, the removable tube 7 to be engaged with the fixed assembly is moved along the main extension axis X so as to insert it in the second portion 121" of the internal channel 121, and in particular coaxial with the latter.

Advantageously, the removable tube 7 is moved along the main extension axis 7 at a height such that the first groove 81 thereof is placed in connection with the retention seat 85.

In addition, the method, object of the present invention, comprises a blocking step, in which the second quick coupling 8 is actuated in order to prevent the movement of the removable tube along the main extension axis X.

More in detail, in such step the blocking element 82 is moved from the release configuration, in which the blocking element 82 is disengaged at least from the first groove 81 in order to allow the movement of the removable tube 7 along the main extension axis X, to the blocking configuration, in which the blocking element 82 engages the retention seat 85 and the first groove 81 in order to prevent the movement of the removable tube 7 along the main extension axis X.

For example, as can be seen in FIGS. 4*a* and 4*b*, the valve group 1, object of the present invention, can be configured for filling containers 102, and in particular cans, with dimensions that differ from each other. In particular, with the variation of the dimensions of the can 102 to be filled, a removable tube 7 is installed on the valve group 1 with a first angle α specially designed for the shape of the specific can that is to be filled.

Advantageously, the centering body 5 is also substituted, such that with the variation of the dimensions of the can 102 to be filled, a centering body 5 is installed on the valve group 1 with a second angle β and a seal 51 specially designed for the shape of the specific can that is to be filled.

The invention thus conceived therefore attains the pre-established objects.

The contents of the Italian patent application number 102022000018600, from which this application claims priority, are incorporated herein by reference.

The invention claimed is:

1. A filling valve group for a filling machine, said filling valve group comprising:

a supply duct (2) susceptible of being placed in fluid communication with a containment tank (105) fixed to a support structure (104) of a filling machine, for flowing a liquid from said containment tank (105) to a container (102) to be filled with said liquid; wherein said supply duct (2) is extended along a main extension axis (X) between an inlet section (21) and an outlet section (22), at which said supply duct (2) is susceptible of being associated with said container (102);

an air return tube (3), which is extended along said main extension axis (X) and is placed at least partially within said supply duct (2);

a shutter (4), which is placed to intercept said supply duct (2) and is provided with a narrowing portion (41) fixed to said supply duct (2), and with an enlarged portion (42) fixed to said air return tube (3) and movable with respect to said narrowing portion (41) in order to open and close said shutter (4);

a centering body (5), which is mounted on a lower portion (11) of said filling valve group, is placed at the outlet section (22) of said supply duct (2), and comprises a seal (51) defining a first lower surface (52) susceptible of receiving in abutment a mouth of said container (102); wherein said centering body (5) is removably fixed to the lower portion (11) of said filling valve group by means of a first quick coupling (6);

a fixed assembly (12), which is mechanically and rigidly connectable to the support structure (104) of the filling machine, and forms an upper section (23) of the supply duct (2);

a removable tube (7), which forms a lower section (24) of the supply duct (2) and is removably fixed to said fixed assembly (12) by means of a second quick coupling (8), said removable tube (7) carrying, fixed thereto, the narrowing portion (41) of said shutter (4);

wherein the narrowing portion (41) of said shutter (4) comprises a flared wall (411) that is extended from a narrow internal section (25) of said supply duct (2) to said enlarged outlet section (22) of said supply duct (2) for the evacuation of said liquid.

2. The filling valve group of claim 1, wherein said flared wall (411) is extended with substantially frustoconical shape around said main extension axis (X) away from said main extension axis (X) towards said outlet section (22).

3. The filling valve group of claim 1, wherein said fixed assembly (12) comprises an internal channel (121) extended along said main extension axis (X); wherein said internal channel (121) is provided with a first portion (121'), which is defined by said upper section (23) of the supply duct (2), and with a second portion (121"), which is engaged, internally and coaxially, by said removable tube (7).

4. The filling valve group of claim 1, wherein said second quick coupling (8) comprises a first groove (81) obtained externally on said removable tube (7), and a blocking element (82) integral with said fixed assembly (12) and mechanically removably engaged in said first groove (81) in order to retain said removable tube (7) mechanically connected to said fixed assembly (12).

5. The filling valve group of claim 4, wherein said blocking element (82) is engaged in a retention seat (85); wherein said retention seat (85) is connected with said first groove (81), and is movable between:

a blocking configuration, in which said blocking element (82) engages said retention seat (85) and said first groove (81) in order to prevent a movement of said removable tube (7) along said main extension axis (X);

a release configuration, in which said blocking element (82) is disengaged at least from said first groove (81) in order to allow the movement of said removable tube (7) along said main extension axis (X).

6. The filling valve group of claim 5, wherein said second quick coupling (8) comprises at least one first presser (84) mounted integral with said fixed assembly (12); wherein said at least one first presser (84) interferes in retention relationship with a corresponding first engagement seat (821) of said blocking element (82) in order to prevent said blocking element (82) from moving from said blocking configuration to said release configuration.

7. The filling valve group of claim 1, wherein said first quick coupling (6) comprises at least one retention tab (61) fixed to said centering body (5) and extended radially with respect to said main extension axis (X);

wherein said lower portion (11) comprises an annular support element (111) which is extended along said main extension axis (X) starting from an abutment surface (113);

wherein an insertion seat (112) is made on said annular support element (111);

wherein said centering body (5) is placed at least partially within said insertion seat (112) and said at least one retention tab (61) is in abutment against said abutment surface (113) in order to prevent a movement of said centering body (5) along said main extension axis (X).

8. The filling valve group of claim 7, wherein said first quick coupling (6) comprises at least one slide seat (62), which is made on said annular support element (111), is extended along said main extension axis (X), is connected to said insertion seat (112) and is provided with a transverse section with respect to said main extension axis (X) that is counter-shaped with respect to said at least one retention tab (61);

wherein said centering body (5) is rotatable around said main extension axis (X) between:

an engagement position, in which said at least one retention tab (61) is misaligned with respect to said at least one slide seat (62) in order to prevent the movement of said centering body (5) along said main extension axis (X);

a disengagement position, in which said at least one retention tab (61) is aligned with respect to said at least one slide seat (62) in order to allow the movement of said centering body (5) along said main extension axis (X) so to extract said centering body (5) from said insertion seat (112).

9. The filling valve group of claim 8, wherein said first quick coupling (6) comprises at least one second presser (63) integrally mounted on said annular support element (111); wherein said at least one second presser (63) interferes in retention relationship with a corresponding second engagement seat (611) of said at least one retention tab (61) in order to prevent a rotation of said centering body (5) around said main extension axis (X) from said engagement position to said disengagement position.

10. A filling machine for filling containers (102) with liquids, which comprises:

a rotary carousel (103) provided with at least one containment tank (105) of a liquid to be bottled;

at least one filling valve group of claim 1, said filling valve group being fixed to said rotary carousel (103) and being in fluid communication with said at least one containment tank (105).

* * * * *